(12) United States Patent
Poth

(10) Patent No.: US 7,003,378 B2
(45) Date of Patent: Feb. 21, 2006

(54) HVAC CONTROL USING DIFFERENT ACCESS LEVELS

(75) Inventor: Robert J. Poth, Austin, TX (US)

(73) Assignee: MMI Controls LP, Austin, TX (US)

( * ) Notice: Subject to any disclaimer, the term of this patent is extended or adjusted under 35 U.S.C. 154(b) by 0 days.

(21) Appl. No.: 10/817,631

(22) Filed: Apr. 2, 2004

(65) Prior Publication Data

US 2004/0193548 A1    Sep. 30, 2004

Related U.S. Application Data

(63) Continuation of application No. 09/935,281, filed on Aug. 22, 2001, now Pat. No. 6,741,915.

(51) Int. Cl.
*G06F 17/00*    (2006.01)
*G06F 19/00*    (2006.01)

(52) U.S. Cl. .................. 700/276; 700/278; 236/91 D; 236/3; 236/91 R

(58) Field of Classification Search ............ 700/276, 700/278; 236/91 D, 3, 91 R
See application file for complete search history.

(56) References Cited

U.S. PATENT DOCUMENTS

| | | | |
|---|---|---|---|
| 3,403,382 A | 9/1968 | Frielinghaus et al. | |
| 4,090,248 A | 5/1978 | Swanson et al. | |
| 4,234,927 A | 11/1980 | First | |
| 4,298,946 A * | 11/1981 | Hartsell et al. | 700/278 |
| 4,341,345 A | 7/1982 | Hammer et al. | |
| 4,558,958 A | 12/1985 | Pena et al. | |
| 4,639,876 A | 1/1987 | Deeds | |
| 4,884,214 A * | 11/1989 | Parker et al. | 700/278 |
| 4,918,615 A * | 4/1990 | Suzuki et al. | 700/275 |
| 4,931,948 A | 6/1990 | Parker et al. | |
| 5,170,935 A * | 12/1992 | Federspiel et al. | 236/44 C |
| 5,394,324 A * | 2/1995 | Clearwater | 705/8 |
| 5,544,036 A | 8/1996 | Brown, Jr. et al. | |
| 5,544,809 A | 8/1996 | Keating et al. | |
| 5,554,979 A * | 9/1996 | Kohar et al. | 340/825.72 |
| 5,621,662 A * | 4/1997 | Humphries et al. | 700/276 |
| 5,646,858 A | 7/1997 | Schrock et al. | |
| 5,682,949 A | 11/1997 | Ratcliffe et al. | |
| 5,761,073 A | 6/1998 | Dickson | |
| 5,761,083 A | 6/1998 | Brown, Jr. et al. | |
| 5,822,997 A | 10/1998 | Atterbury | |
| 5,873,519 A | 2/1999 | Beilfuss | |
| 5,909,378 A | 6/1999 | De Milleville | |
| 6,198,996 B1 * | 3/2001 | Berstis | 701/36 |
| 6,240,326 B1 | 5/2001 | Gloudeman et al. | |

(Continued)

OTHER PUBLICATIONS

"ET-4 Installation and Operation Instructions" http://www.enertel.com/manual4.html.*

*Primary Examiner*—Leo Picard
*Assistant Examiner*—Michael D. Masinick
(74) *Attorney, Agent, or Firm*—John Bruckner PC

(57) ABSTRACT

Systems and methods are described for a HVAC control system. A method, includes regulating user access to an interactive user interface of a programmable thermostat, each user identified by a personal identification number associated with a user type such as, for example, building owners, maintenance personnel, building tenants, and manufacturers.

7 Claims, 5 Drawing Sheets

U.S. PATENT DOCUMENTS

| | | |
|---|---|---|
| 6,241,156 B1 | 6/2001 | Kline et al. |
| 6,553,418 B1 | 4/2003 | Collins et al. |
| 6,604,023 B1 | 8/2003 | Brown et al. |
| 6,622,115 B1 | 9/2003 | Brown et al. |
| 6,628,997 B1 | 9/2003 | Fox et al. |
| 6,631,309 B1 | 10/2003 | Boies et al. |
| 6,741,915 B1 * | 5/2004 | Poth ............................ 700/276 |
| 6,842,510 B1 * | 1/2005 | Sakamoto .............. 379/102.01 |
| 2001/0017483 A1 | 8/2001 | Frohberg |
| 2002/0011923 A1 | 1/2002 | Cunningham et al. |
| 2002/0029096 A1 | 3/2002 | Takai et al. |
| 2003/0033057 A1 | 2/2003 | Kallestad |
| 2003/0163222 A1 | 8/2003 | Choi |
| 2003/0200009 A1 | 10/2003 | von Kannewurff et al. |

* cited by examiner

HVAC CONTROL USING DIFFERENT ACCESS LEVELS

CROSS REFERENCE TO RELATED APPLICATIONS

This application is a continuation of, and claims a benefit of priority under 35 U.S.C. 120 from U.S. Ser. No. 09/935,281, filed Aug. 22, 2001 now U.S. Pat. No. 6,741,915 the entire contents of which are hereby expressly incorporated by reference for all purposes.

BACKGROUND OF THE INVENTION

1. Field of the Invention

The invention relates generally to the field of programmable heating, ventilation, and air conditioning (HVAC) systems. More particularly, the invention relates to energy saving programmable HVAC systems. Specifically, a preferred implementation of the invention relates to a usage monitoring programmable HVAC system.

2. Discussion of the Related Art

Heating, ventilation, and air conditioning (HVAC) systems consume a large amount of energy. Commonly, heating and cooling operations are controlled automatically with a thermostat or plurality of thermostats which initiate these operations according to preset temperature limits. The thermostat can be located at a predetermined central local or the plurality of thermostats can be located at a predetermined plurality of locations. The thermostats are capable of detecting changes in room temperature. When the room temperature fluctuates outside the preset high and low temperature limits, the thermostats can trigger a heating, ventilation, and air conditioning unit to heat or cool the room, thus maintaining the room temperature between the preset limits. The thermostats regulate room temperature in this manner regardless of whether or not the building is occupied. Since many buildings may be unoccupied for certain periods of time, the continuous operation of such conventional HVAC systems would result in wastage of a large amount of energy. Attempts have been made to reduce energy wastage by including a timer that simply terminates HVAC system function during a preset interval. Such provision is often impractical since most buildings do not have regular occupancy patterns.

Another problem associated with conventional HVAC systems is the unavailability of personalized billing. Generally, all users of a conventional HVAC system have to pay an equal portion of fixed and variable costs associated with continued operations of the HVAC system. As a result, users often have to pay for HVAC services used by another user.

Heretofore, the requirements of energy conservation and personalized billing referred to above have not been fully met. What is needed is a solution that simultaneously addresses both of these requirements.

SUMMARY OF THE INVENTION

There is a need for the following embodiments. Of course, the invention is not limited to these embodiments.

According to an aspect of the invention, a method comprises: a method, comprises: providing a usage monitoring heating ventilation and air conditioning control system, the usage monitoring heating ventilation and air conditioning control system including a programmable digital thermostat with an on board memory; issuing personal identification numbers to each of a plurality of system users; associating each of the plurality of system users with at least one of a plurality of user types; storing the personal identification numbers in a first data structure in the on board memory; and linking each one of a plurality of entries in the first data structure by reference to at least one of a plurality of entries in a second data structure in the on board memory, the second data structure including a list of user types. According to another aspect of the invention, a method, comprises: receiving a request for an additional period of heating ventilation and air conditioning system services from a requesting system user, the requesting system user composing a plurality of system users; maintaining a data structure in an on board memory of a programmable thermostat, the data structure including a list of time entries, each time entry associated with one of the plurality of system users; and updating the data structure by adding a duration in units of time to the time associated with the requesting system user. According to another aspect of the invention, an apparatus, comprises: a microcontroller; a digital temperature sensor coupled to the microcontroller; a liquid crystal display coupled to the microcontroller; a set of cursor buttons coupled to the microcontroller; an electrically erasable programmable read-only memory coupled to the microcontroller; an upload capable connector coupled to the electronically erasable programmable read-only memory; a real time clock coupled to the microcontroller; and a back up power supply coupled to the real time clock. According to another aspect of the invention, a method, comprises regulating user access to an interactive user interface of a programmable thermostat, each user identified by a personal identification number associated with a user type selected from the group consisting of building owners, maintenance personnel, building tenants, and manufacturers.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
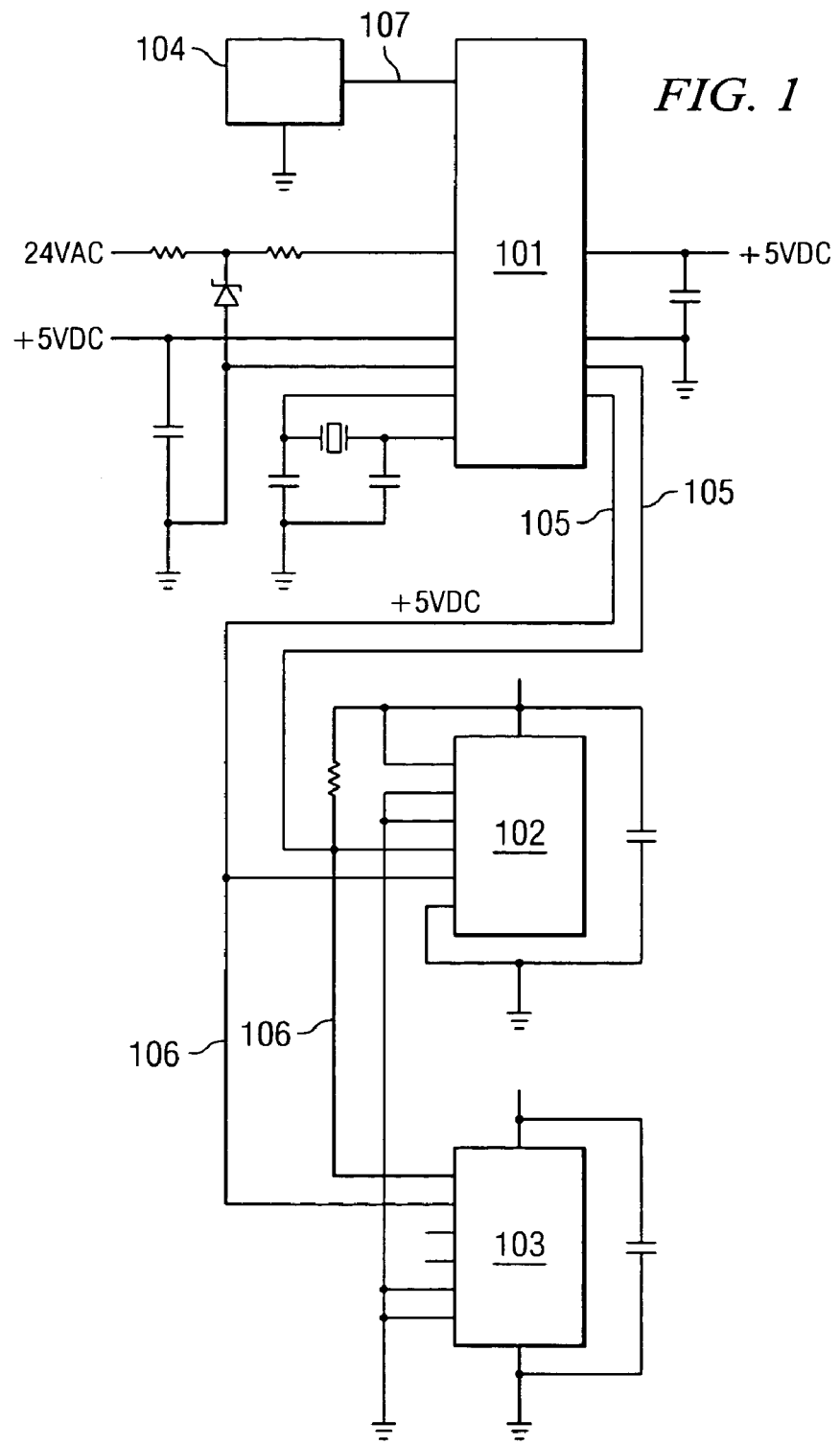
FIG. 1 illustrates a circuit diagram of a temperature sensor, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The context of the invention can include commercial buildings where a plurality of users require HVAC system services. The context of the invention can also include residential buildings.

The invention describes a usage monitoring HVAC control system. The usage monitoring HVAC control system can include a programmable digital thermostat coupled to conventional HVAC equipment, such as compressors and ventilation fans. The programmable digital thermostat can include significant intelligence in hardware and can also include an on-board non-volatile memory coupled to a processor capable of executing software processes. The programmable digital thermostat can be programmed to execute several application-defined processes, and those described herein represent a preferred embodiment of the invention. The programmable digital thermostat can be programmed to execute many other useful processes than those described below.

The invention includes a programmable digital thermostat or a plurality of programmable digital thermostats that are capable of monitoring and regulating room air temperature in an indoor environment. Each of the one or many programmable digital thermostats can control conventional HVAC equipment (e.g. ventilation fans, cooling compressors, and heaters). For convenience, operation of the invention is considered herein to be in an office building environment, however, the same apparatus and methods as described herein can be used in other environments with trivial modifications. The programmable digital thermostats can be configured to regulate room temperature between an upper temperature limit and a lower temperature limit, both of which can be preset to reside between, for example, 50° F. and 90° F., or other limits as deemed ambient. Further, the programmable digital thermostats can be programmed to operate for a preset duration during each business day, presumably when the building is occupied, in the case of an office building during normal office hours. The programmable digital thermostats can regulate room temperature within a preset ambient temperature region during normal office hours. Outside normal office hours, when the building is presumed to be unoccupied, the programmable digital thermostat will no longer regulate room temperature to reside in the ambient temperature region. Instead, the programmable digital thermostat will regulate room temperature to reside in a standby temperature region, the standby temperature region can be determined and preset by building authorities (e.g., between 40° F. and 110° F.). When the building is occupied outside normal business hours and room temperature is maintained by the programmable digital thermostat at a standby temperature, occupants of the building may request additional time periods (e.g. one hour) during which the programmable digital thermostat will resume normal HVAC system operation and maintain room temperature within the preset ambient temperature. The programmable digital thermostat can monitor and accrue such requests for additional periods of normal HVAC system operation. HVAC system usage information can then be downloaded from the programmable digital thermostat and uploaded onto a central billing computer. Thus, building occupants can be billed individually for additional HVAC system services.

Access to HVAC system controls can be restricted by personal identification numbers (PINs) issued to each system user. In one embodiment, there can be five different HVAC control system access levels. The number of different access levels can be chosen as required. Each user can be given a PIN that is recognized by the programmable digital thermostat as belonging to one of the five access levels. The programmable digital thermostat allows those identified as building tenants to order additional periods of ambient temperature. Users identified as building owners or maintenance personnel are granted further system access. Building owners can change ambient temperature setting and hours of normal system operation. If building tenants order additional periods of ambient temperature, the system usage data, i.e., the duration of time for which ambient temperature is ordered, is recorded in the local memory of the programmable digital thermostat. Hours of additional system usage for each user is recorded and accrued according to each user's PIN. The usage data can then be transferred from the local memory of the programmable digital thermostat to a central billing computer via a hand-held personal data assistant (PDA) or via wireless transmission or via hardwire connection. Usage data can be transferred into a spreadsheet format on the central billing computer. The spreadsheet thus created can contain information such as user PIN and total additional ambient temperature hours ordered.

A calendar can also be included in the local memory of the programmable digital thermostat. The calendar can be preset to indicate holidays and weekends, i.e., longer periods for which the programmable digital thermostat can revert to the standby temperature setting.

HVAC system usage data can be collected from the local memory of each programmable digital thermostat via either a hand-held PDA or a wireless transmitter. The wireless transmitter can be contained within the thermostat module. The thermostat module can include an universal serial bus (USB) interface for data download to a hand-held PDA. Usage data can then be uploaded to a central billing computer. The invention can include apparatus and methods to convert the usage data stored in the programmable digital thermostat to a spreadsheet format that can be displayed on the central billing computer. Use of a wireless transmitter can also be extended to allow users to order ambient temperature over a wireless medium.

Referring to FIG. 1, a temperature sensor control circuit is shown. A voltage monitor 104 can be coupled to a microcontroller 101 via a bus 107. The voltage monitor 104 includes a 5 VDC power supply to energize the circuit of FIG. 1. An electrically erasable programmable read-only memory (EEPROM) memory board 102 can be coupled to the microcontroller 101 via a bus 105. An electronic temperature sensor 103 can be coupled to the EEPROM memory board 102 via a bus 106.

Still referring to FIG. 1, an electronic temperature sensor 103 can measure room temperature at regular intervals. During each room temperature measurement, the electronic temperature sensor 103 can send temperature data to an EEPROM memory board 102 via a bus 106. The temperature data can be stored in the EEPROM memory board 102, and a copy of the temperature data can be transmitted to the microcontroller 101 via a bus 105. The microcontroller 101 can read the temperature data and send signals to HVAC units (not shown) to regulate room temperature at a programmed level. The circuit of FIG. 1 can be used to implement a standard temperature monitor and control system.

Figure 2A:
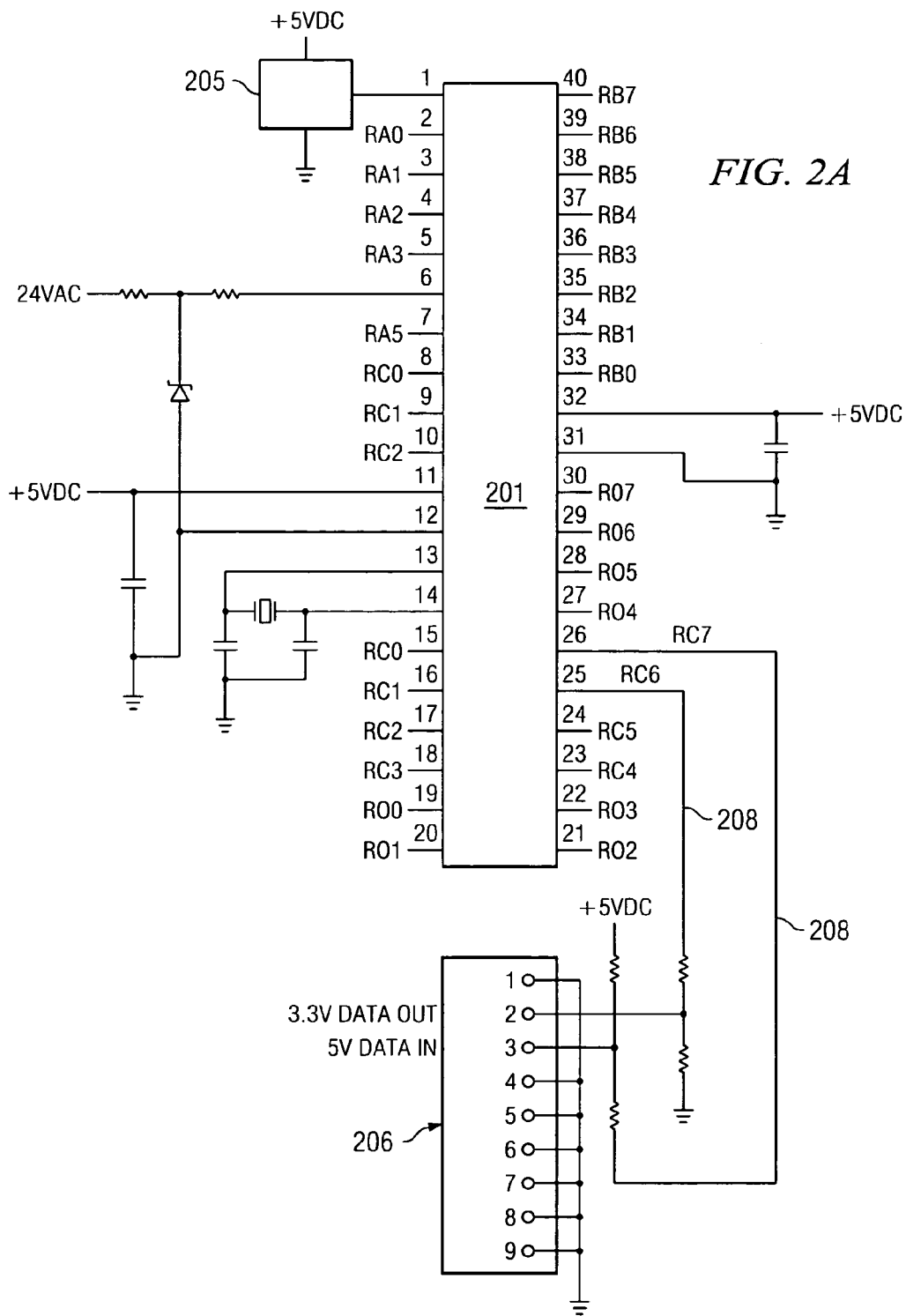
FIGS. 2A and 2B illustrate circuit diagrams of a control system, representing an embodiment of the invention.
Figure 2B:
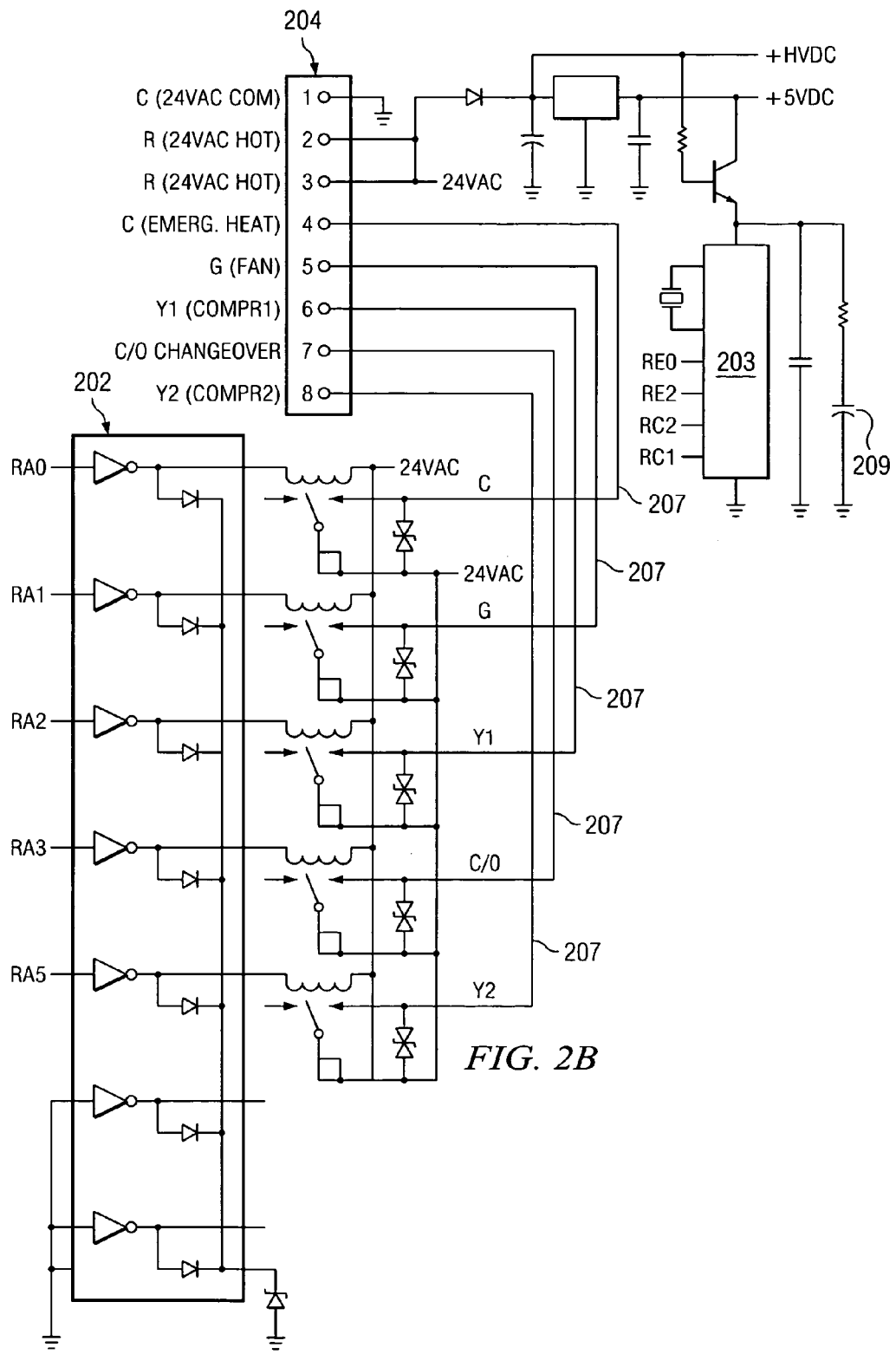

Referring to FIGS. 2A and 2B, circuit diagrams of a HVAC control system are shown. Several terminal couplings are not shown in the circuit diagrams for increased clarity. Terminal couplings, unless implicitly shown as hardwire connections in the circuit diagrams, are indicated by reference letters at each terminal, wherein like reference letters at two terminals indicate that they are coupled. A voltage monitor 205 can be coupled to a microcontroller 201 via a bus. The microcontroller 201 can be coupled to a relay driver 202 (terminal connections are not shown). The relay driver 202 can be coupled to a terminal block 204 via a plurality of buses 207. The terminal block 204 can be coupled to various HVAC equipment such as a fan, a compressor, an emergency heating unit, etc. A real time clock 203 can be coupled to the terminal block 204. A back up power capacitor 209 can be coupled to the real time clock 203. A serial interface 206 can be coupled to the microcontroller 201 via a bus 208.

Still referring to FIGS. 2A and 2B, current can be supplied to the entire circuit by a voltage monitor 205. The voltage monitor 205 rectifies and steps down 24 VAC (standard HVAC power supply) to 5 VDC which is suitable for driving electronic circuits. A microcontroller 201 can receive temperature data from a temperature sensor (circuit of FIG. 1) and send corresponding heating and/or cooling instructions to HVAC equipment via a relay driver 202 and a terminal block 204. A real time clock 203 can be responsible for maintaining a timing mechanism, allowing the microcontroller 201 to maintain HVAC system operation at different temperatures at different times, such as office hours and after hours, weekends, and holidays. A back up power capacitor 209, supplies power to the real time clock 203, in case power supply is momentarily interrupted. HVAC system usage data that can be stored in system memory can be accessed by the microcontroller 201 and uploaded to a hand held PDA via a serial interface 206. The HVAC system usage data can further be uploaded onto a central billing computer from the hand held PDA to allow individual users to be billed for HVAC services.

Figure 3:
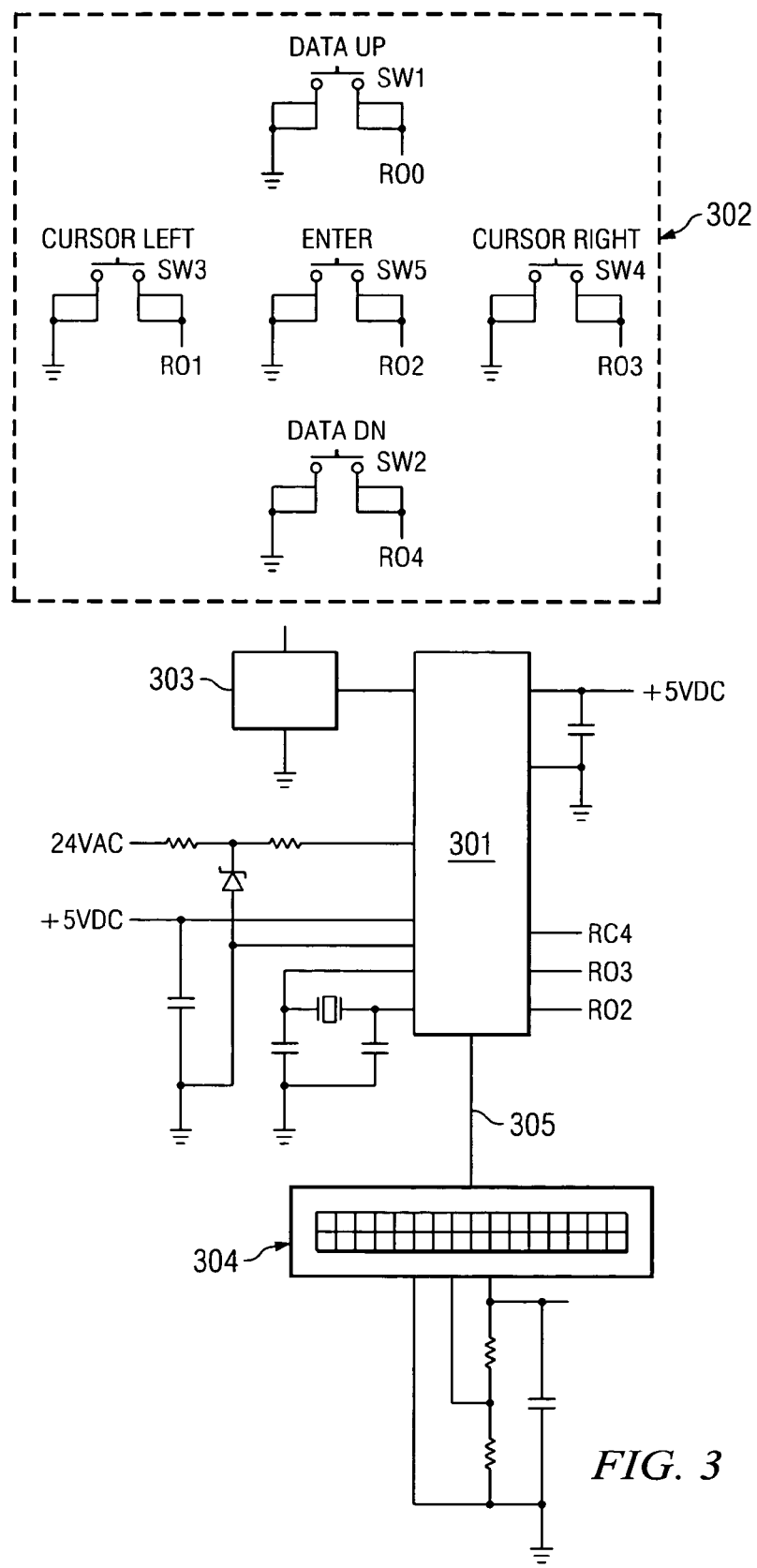
FIG. 3 illustrates a circuit diagram of a display control, representing an embodiment of the invention.

Referring to FIG. 3, a display control circuit is shown. Several terminal couplings are not shown in the circuit diagram for increased clarity. Terminal couplings, unless implicitly shown as hardwire connections in the circuit diagram, are indicated by reference letters at each terminal, wherein like reference letters at two terminals indicate that they are coupled. A microcontroller 301 can be coupled to a voltage monitor 303. A set of cursor buttons 302 can be coupled to the microcontroller 301. A liquid crystal display (LCD) 304 can also be coupled to the microcontroller 301 via a bus 305. A 2×16 LCD is shown in FIG. 3. Other types of LCD displays can also be used in the configuration shown.

Still referring to FIG. 3, a start menu can be presented to users via a liquid crystal display 304. Information displayed on the liquid crystal display 304 can be processed by a microcontroller 301. Such information can include a calendar, a personal identification number prompt, temperature readings, and HVAC system usage data. Users can key in their PIN using a set of cursor buttons 302 that are housed on a thermostat casing (see FIG. 4). Once a user PIN is entered, the microcontroller 301 displays subsequent menus to the user via the liquid crystal display 304. The subsequent menus that are displayed can depend on user type. User types can include tenants, building owners, maintenance personnel, manufacturer. The microcontroller 301 can access an electrically erasable programmable read-only memory to associate each entered user PIN to a user type. Depending on the user type, users can order additional HVAC services using the set of cursor buttons 302.

Figure 4:
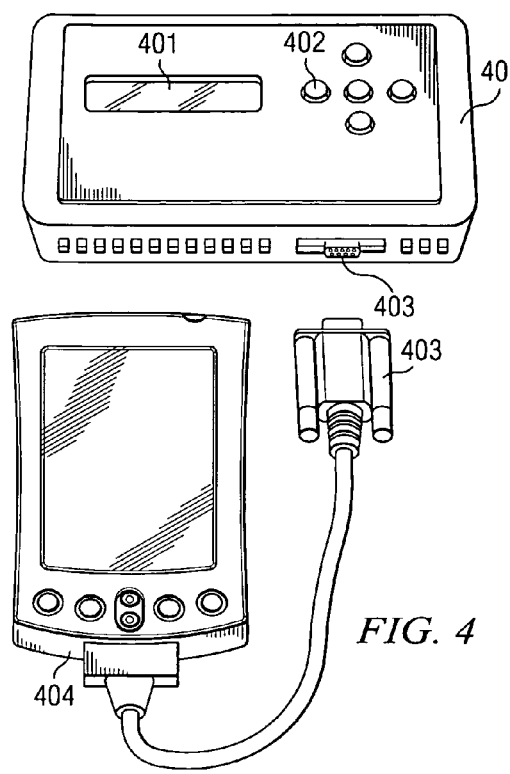
FIG. 4 illustrates a surface view of a usage monitoring HVAC control system, representing an embodiment of the invention.

Referring to FIG. 4, a usage monitoring programmable thermostat with HVAC system usage data upload capabilities is shown. A wall mounted thermostat casing 405 is shown. The surface of the thermostat casing 405 can include a liquid crystal display 401 and a set of cursor buttons 402. The thermostat casing 405 can also include a serial port 403. Also shown in FIG. 4 is a hand held PDA 404 that can be used to download HVAC system usage data from memory housed within the thermostat casing 405 via a serial port 403.

Figure 5:
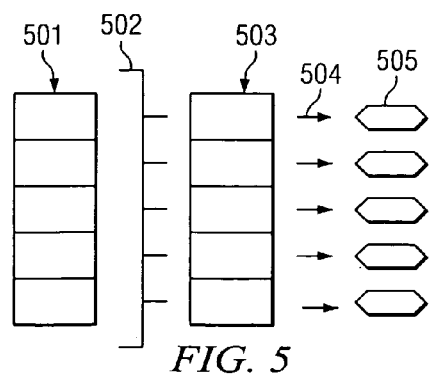
FIG. 5 illustrates a data structure that can be stored in electrically erasable programmable read-only memory, representing an embodiment of the invention.

FIG. 5 depicts a software subsystem including a data structure including a list of PINs, each of which can be associated with a user type, wherein each PIN represents an HVAC system user. Each user of the HVAC system can be identified by a PIN. PINs for all users of the HVAC system can be stored in EEPROM that is housed in a programmable digital thermostat. FIG. 5 shows a method of software management that can be used with the invention to implement PIN restricted HVAC system control access. Each user PIN can be stored in EEPROM as an entry in a data structure of PINs 501. The illustration depicts a simple linked list as a preferred algorithm for implementing the data structure of PINs 501. It should be apparent to those skilled in the art that other algorithms may be used to implement the data structure. Alternative algorithms can include doubly linked lists, binary trees, queues, hashes, stacks, heaps, tables, and dequeues. The data structure of PINs 501 can then be processed by a software filter 502. The software filter 502 can associate each PIN in the data structure of PINs 501 with exactly one of a plurality of user types. Therefore, each user PIN can be associated in software with exactly one user type. User types can be stored in a secondary data structure 503 in EEPROM. There are several methods by which each user PIN can be associated with a user type in the software filter 502. A simple method would be to give all PINs associated with a single user type a common digit. For example, all PINs containing a "0" in a least significant digit can be associated with the user type of building owners. In this case, a very simple software filter 502 can be designed to associate all PINs ending in "0" with the user type of building owners. Of course, there are other more elegant methods that can be used to associate a user PIN with a user type classification. Once all the PINs in the data structure of PINs 501 have been associated with a user type by the software filter 502, all the PINs associated with each user type can be presented with access to all privileges associated with that particular user type. Privileges associated with each user type can be stored in an auxiliary data structure 505 that can be passed by reference 504 to each user type within the secondary data structure 503. Thus each user can be presented with privileges associated with their user type, characterized by their PIN. These privileges can be presented to users via an interactive display as indicated in FIG. 4. Of course, alternative methods can easily be used to implement PIN restricted HVAC system control access. For example, a lookup table containing unused PINs can be stored locally in EEPROM and issued to users at random. When each new PIN is issued, a microcontroller can determine the user type the PIN is being issued to, and associate that particular user type to the newly issued PIN in memory.

Figure 6:
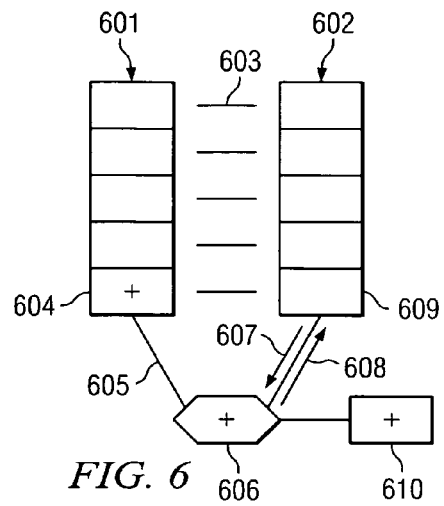
FIG. 6 illustrates a software subsystem, representing an embodiment of the invention.

Referring to FIG. 6, a schematic diagram of data structures and software processes associated with the invention is shown. In particular, FIG. 6 shows a method by which HVAC system usage data can be accrued and stored in EEPROM housed in a programmable digital thermostat. Of course, the methods described herein are given by way of example only and other implementations are possible. When a user orders additional HVAC system services, the user can enter their PIN on a keypad housed on the programmable digital thermostat, and subsequently request HVAC services. In software, the user's PIN can be stored as an entry 604 in a data structure of PINs 601 (see also FIG. 5). When the user requests additional HVAC services, a flag can be raised in the data structure of PINs 601, under the user's specific PIN entry 604. In FIG. 6, such a flag can be denoted by a "+" sign. A microcontroller 606 can detect flags in the data structure of PINs 601 via a internal software thread 605. Once the microcontroller detects the presence of a flag requesting additional HVAC services, it directs HVAC equipment such as compressors, fans, etc. to resume normal operation rather than remain in a standby mode. When the user completes use of additional HVAC services, the flag can be removed from the data structure of PINs 601. When the microcontroller detects the removal of the flag, it accesses a system clock 610 for information related to the additional HVAC services ordered by the user. The microprocessor then accesses a data structure of historical HVAC system usage data 602. The data structure of historical HVAC system usage data 602 contains accrued HVAC system usage data for each user pin belonging to the data structure of PINs 601. Each entry in the data structure of PINs 601 can be pointed by reference 603 to an associated entry in the data structure of historical HVAC system usage data. A copy of the user's historical HVAC system usage data 609 can then be copied to the microcontroller 606 via a download software thread 607. The microcontroller 606 can then update the user's historical HVAC system usage data by adding to it the data passed to it by the system clock 610. Then, the microcontroller 606 can write the new value for the user's historical HVAC system usage data to the user's entry 609 in the data structure of historical HVAC system usage data 602 via a upload software thread 608. Thus the data structure of historical HVAC system usage data 602 is dynamic and can be updated automatically by the software subsystem described above. The data structure of historical HVAC system usage data 602 along with the data structure of PINs 601 and corresponding reference pointers 603 can all subsequently be uploaded from EEPROM on board the programmable digital thermostat to a central billing computer, where users can be billed for additional HVAC services according to their PIN. A potentially more efficient method of dynamically accruing and storing historical HVAC system usage data for each user can involve utilizing temporary storage systems, such as an auxiliary memory unit, in conjunction with the microcontroller 606 and EEPROM. Instead of copying and downloading historical HVAC system usage data from the data structure of historical HVAC system usage data 602 to the microcontroller 606, a dynamic copy of the data structure of historical HVAC system usage data 602 can be stored and automatically updated in the auxiliary memory unit.

Figure 7:
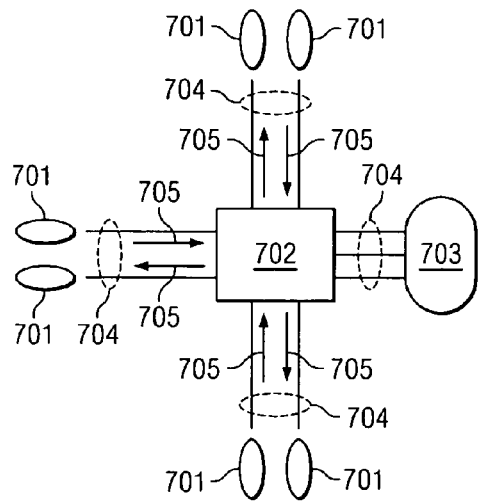
FIG. 7 illustrates a usage monitoring HVAC control system, representing an embodiment of the invention.

Referring to FIG. 7, a usage monitoring HVAC control system is shown. A programmable digital thermostat with on board memory 702 can be coupled to a plurality of user nodes 701 via interconnects 704. The interconnects 704 can include hardwire connections, wireless connections, and indirect connections, such as via a hand held PDA or auxiliary computer. Boosters 705 can also be placed on the interconnects to improve communication between the user nodes 701 and the programmable digital thermostat 702. The programmable digital thermostat 702 can be coupled to a plurality of HVAC equipment such as compressors, heaters, and air conditioners (not shown). A central billing computer 703 can be coupled to the programmable digital thermostat 702.

Still referring to FIG. 7, user nodes 701 can be used to request periods of HVAC service via the programmable digital thermostat 702. The programmable digital thermostat 702 can direct HVAC equipment to operate according to user requests. The programmable digital thermostat 702 can accrue and store information regarding all such user requests over a period of time, for example a month, after which it can upload the information to a central billing computer 703. The central billing computer 703 can process this information and subsequently bill individual users depending on the amount of time for which they requested HVAC services.

The invention can also be included in a kit. The kit can include some, or all, of the components that compose the invention. The invention is ideally suited for retrofit applications, requiring little or no modification to use the invention as an improvement to existing HVAC control systems. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

Practical Applications of the Invention

A practical application of the invention that has value within the technological arts is in office building environments. The invention can readily replace existing HVAC control systems with little or no modification. There are virtually innumerable uses for the invention, all of which need not be detailed here.

Advantages of the Invention

A usage monitoring HVAC control system, representing an embodiment of the invention, can be cost effective and advantageous for at least the following reasons. The invention greatly reduces overhead energy costs by regulating room air temperature settings according to building occupancy. The invention also allows users to be billed individually for HVAC system services, according to their PIN, thereby preventing users from paying more for more HVAC system services than they require. The invention can be used to display accrued HVAC services ordered by each user. The invention also improves quality and/or reduces costs compared to previous approaches.

All the disclosed embodiments of the invention disclosed herein can be made and used without undue experimentation in light of the disclosure. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, variation may be made in the steps or in the sequence of steps composing methods described herein.

Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
   providing a usage monitoring heating ventilation and air conditioning control system, the usage monitoring heating ventilation and air conditioning control system including a programmable digital thermostat with an on board memory;
   issuing personal identification numbers to each of a plurality of system users;
   associating each of the plurality of system users with at least one of a plurality of user types;
   storing the personal identification numbers in a first data structure in the on board memory; and
   linking each one of a plurality of entries in the first data structure by reference to at least one of a plurality of entries in a second data structure in the on board memory, the second data structure including a list of user types; and
   recording and accruing usage monitoring heating ventilation and air conditioning control system usage data in the on board memory of the programmable digital thermostat according to each of the plurality of system users' personal identification numbers,
   wherein hours of additional usage monitoring heating ventilation and air conditioning control system usage for each of the plurality of system users is accrued in the on board memory of the programmable digital thermostat according to each user's personal identification number.

2. The method of claim 1, wherein each of the plurality of user types is associated with at least one of a plurality of function sets.

3. The method of claim 1, wherein the on board memory includes a member selected from the group consisting of electrically erasable programmable read only memory, flash memory, and random access memory.

4. The method of claim 1, further comprising:
   dynamically updating the first data structure; and
   dynamically updating the second data structure.

5. A method, comprising
   regulating user access to an interactive user interface of a programmable thermostat, each user identified by a personal identification number associated with a user type selected from the group consisting of building owners, maintenance personnel, building tenants, and manufacturers; and
   recording and accruing usage monitoring heating ventilation and air conditioning control system usage data in an on board memory of the programmable thermostat according to each user's personal identification numbers,
   wherein hours of additional usage monitoring heating ventilation and air conditioning control system usage for each of the plurality of system users is accrued in the on board memory of the programmable digital thermostat according to each user's personal identification number.

6. The method of claim 5, wherein each user's personal identification number belongs to exactly one user type.

7. The method of claim 5, wherein access to the interactive user interface of the programmable thermostat is regulated using at least one of a plurality of software filters.

* * * * *

UNITED STATES PATENT AND TRADEMARK OFFICE
CERTIFICATE OF CORRECTION

PATENT NO. : 7,003,378 B2
APPLICATION NO. : 10/817631
DATED : February 21, 2006
INVENTOR(S) : Robert J. Poth It is certified that error appears in the above-identified patent and that said Letters Patent is hereby corrected as shown below:

On the Title Page, item (73), please change "Assignee: MMI Controls LP"

to --Assignee: MMI Controls Ltd.--

Signed and Sealed this

Eighth Day of September, 2009

David J. Kappos
*Director of the United States Patent and Trademark Office*